(12) United States Patent
Chatterjee et al.

(10) Patent No.: US 8,549,522 B1
(45) Date of Patent: Oct. 1, 2013

(54) AUTOMATED TESTING ENVIRONMENT FRAMEWORK FOR TESTING DATA STORAGE SYSTEMS

(75) Inventors: Paresh Chatterjee, Fremont, CA (US); Srikumar Subramanian, Fremont, CA (US); Narayanaswami Ganapathy, Fremont, CA (US)

(73) Assignee: American Megatrends, Inc., Norcross, GA (US)

( * ) Notice: Subject to any disclaimer, the term of this patent is extended or adjusted under 35 U.S.C. 154(b) by 1225 days.

(21) Appl. No.: 12/173,238

(22) Filed: Jul. 15, 2008

Related U.S. Application Data (60) Provisional application No. 60/950,670, filed on Jul. 19, 2007.

(51) Int. Cl.
*G06F 11/28* (2006.01)
(52) U.S. Cl.
USPC .......................................... 718/102; 718/106
(58) Field of Classification Search
None
See application file for complete search history.

(56) References Cited

U.S. PATENT DOCUMENTS

| | | | |
|---|---|---|---|
| 4,942,579 A | | 7/1990 | Goodlander et al. |
| 5,257,367 A | | 10/1993 | Gooddlander et al. |
| 5,615,335 A | * | 3/1997 | Onffroy et al. ................. 714/30 |
| 5,720,027 A | | 2/1998 | Sarkozy et al. |
| 5,732,238 A | | 3/1998 | Sarkozy |
| 5,790,774 A | | 8/1998 | Sarkozy |
| 5,893,919 A | | 4/1999 | Sarkozy et al. |
| 6,014,760 A | * | 1/2000 | Silva et al. ....................... 714/46 |
| 6,094,531 A | * | 7/2000 | Allison et al. ................. 717/176 |
| 6,098,128 A | | 8/2000 | Velez-McCaskey et al. |
| 6,182,253 B1 | * | 1/2001 | Lawrence et al. ............. 714/718 |
| 6,502,102 B1 | * | 12/2002 | Haswell et al. ........................ 1/1 |
| 6,701,514 B1 | * | 3/2004 | Haswell et al. ............... 717/115 |
| 7,209,851 B2 | * | 4/2007 | Singh et al. ................... 702/119 |
| 2003/0229467 A1 | * | 12/2003 | Lara .............................. 702/119 |
| 2005/0193269 A1 | * | 9/2005 | Haswell et al. ................. 714/38 |
| 2005/0289272 A1 | * | 12/2005 | Masuoka et al. .............. 710/260 |
| 2006/0106825 A1 | * | 5/2006 | Cozzi ............................. 707/100 |
| 2007/0094542 A1 | * | 4/2007 | Bartucca et al. ................. 714/38 |
| 2008/0120521 A1 | * | 5/2008 | Poisson et al. .................. 714/26 |
| 2008/0172579 A1 | * | 7/2008 | Hahm et al. ..................... 714/37 |

OTHER PUBLICATIONS

Iyengar, V.; Chakrabarty, K.; , "System-on-a-chip test scheduling with precedence relationships, preemption, and power constraints," Computer-Aided Design of Integrated Circuits and Systems, IEEE Transactions on , vol. 21, No. 9, pp. 1088-1094, Sep. 2002.*

* cited by examiner

*Primary Examiner* — Eric Coleman
(74) *Attorney, Agent, or Firm* — Meunier Carlin & Curfman, LLC (57) ABSTRACT

Technologies for an automated testing environment (ATE) framework can support the creation and execution of various automated tests on data storage systems. The ATE framework can support various configurations of multiple client systems exercising multiple storage target systems. A connectionless communication model can be supported among elements within the ATE. Complex tests can be subdivided into smaller jobs that can be executed sequentially, in parallel, or any combination thereof. Sophisticated scheduling mechanisms can include dependency relationships that can require one job to finish before another job begins. Multiple storage targets and multiple initiators can be involved in various configurations and combinations for specific testing tasks. The ATE framework can support extensibility, test tracking, reporting of test results, and fault injection.

20 Claims, 7 Drawing Sheets

AUTOMATED TESTING ENVIRONMENT FRAMEWORK FOR TESTING DATA STORAGE SYSTEMS

CROSS-REFERENCE TO RELATED APPLICATION

This application claims the benefit of U.S. provisional patent application No. 60/950,670, filed on Jul. 19, 2007, entitled "A Novel Method of Testing Storage Systems Using Automated Testing Environment Framework," which is expressly incorporated herein by reference in its entirety.

BACKGROUND

Data storage server solutions can be complex systems having multiple elements, functions, and possible points of failure. Testing such complex systems presents numerous challenges for verifying the proper functionality, performance, and data integrity of the data storage systems. Generally many hours of intense testing is performed to verify these characteristics of a data storage system. Scheduling and performing numerous test procedures along with proper regression testing can become an extremely time consuming undertaking.

Complex resource management may be a large part of data storage system testing. Various tests to be performed may involve different combinations and configurations of multiple clients and multiple storage servers. Setting up data storage system tests consistently, correctly, and repeatedly can be a tedious, error prone, and expensive undertaking. Various additional aspects of testing data storage solutions, such as regression testing, fault injection, data collection, and data analysis can present additional challenges.

It is with respect to these considerations and others that the disclosure made herein is presented.

SUMMARY

Technologies are described herein for an automated testing environment (ATE) framework supporting the creation and execution of various automated tests on data storage systems. Such testing can include black-box testing, functional testing, system testing, performance testing, and regression testing. The ATE framework can support various configurations of multiple storage systems serving multiple client system. The framework can also support tests that inject failures, such as power failure scenarios. The scalable and modular framework can subdivide complex tests into smaller jobs. These jobs can be executed sequentially, in parallel, or any combination.

According to one aspect, the ATE framework can support subdividing jobs into smaller units. These units may be referred to as jobs. The ATE framework can also support scheduling the jobs to execute in parallel, in series, or any combination thereof using various dependency relationships. The dependency relationships can require one job to finish before another one begins. A tighter dependency relationship can require the first job to not only finish, but to complete successfully, before the second job begins.

According to another aspect, the ATE framework can support the management of numerous resources involved in a test or a sequence of tests. Multiple storage targets and multiple initiators can be involved in various configurations and combinations for specific test tasks. Using dependency relationships, the ATE framework can support the scheduling of jobs over time so as to avoid resource conflicts within the test environment.

According to other aspects, the ATE framework can support extensibility, test tracking, reporting of test results, and fault injection. The modular job model of the ATE framework can support the addition of new test functions with the addition of new test scripts into a task order of jobs for execution. The scheduling mechanisms of the ATE framework can support tracking the execution of many jobs using different elements within the test environment in different combinations and configurations. Test responses and file transfer mechanisms within the ATE framework can support the reporting of test results from multiple test entities to a centralized controller. A connectionless communications model among elements of the test environment can support power failure scenarios within a test such that testing can automatically continue after elements are powered back up.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for an automated testing environment framework supporting the creation and execution of various automated tests on data storage systems. Through the use of the embodiments presented herein, technologies for an ATE framework can support black-box testing, functional testing, system testing, performance testing, and regression testing within various configurations of multiple storage systems serving multiple client systems.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for automated testing environment frameworks supporting the creation and execution of various automated tests on data storage systems will be described.

Figure 1:
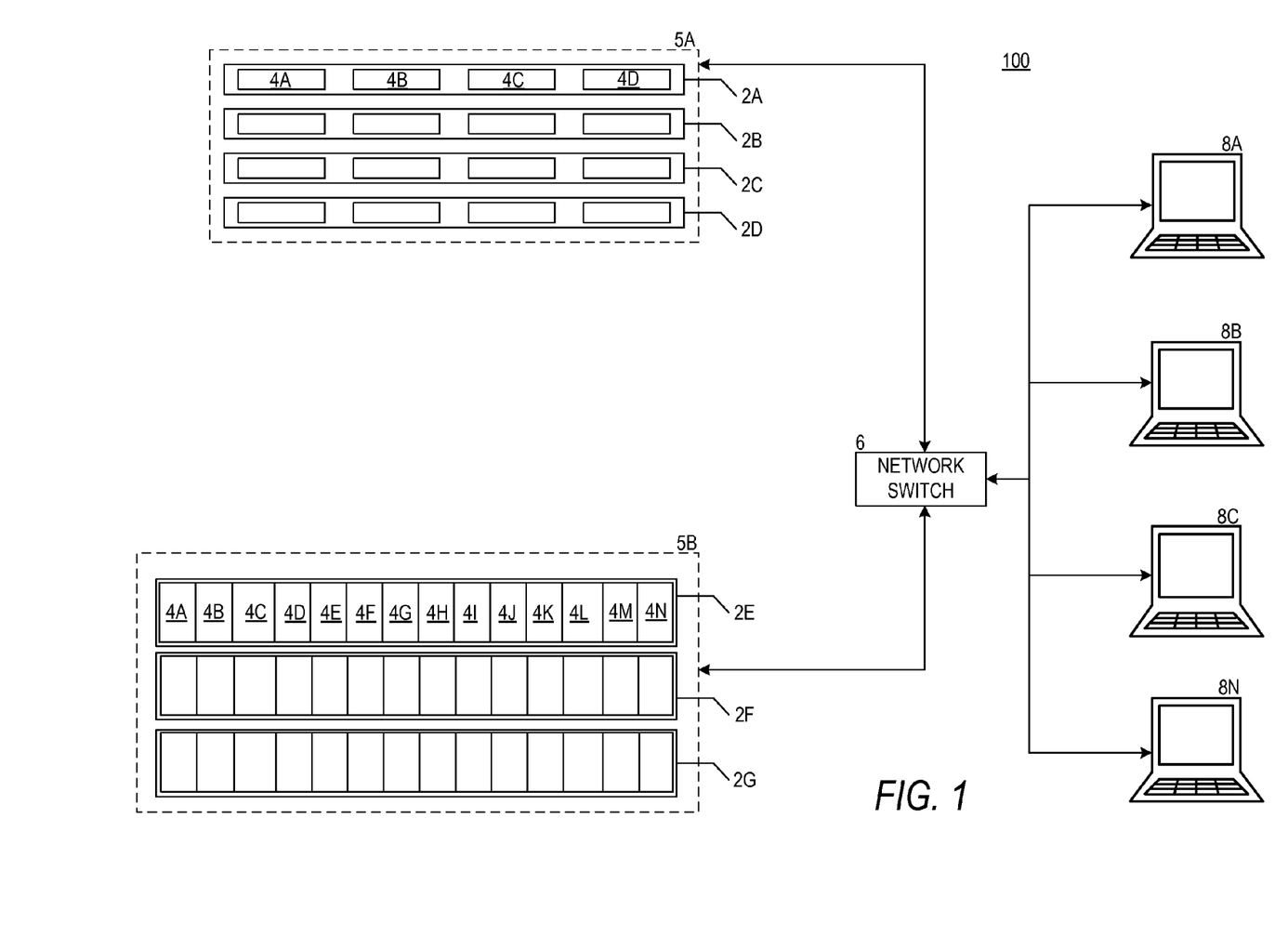
FIG. 1 is a network architecture diagram illustrating aspects of a storage system according to one exemplary embodiment.

Turning now to FIG. 1, details will be provided regarding an illustrative operating environment for the implementations presented herein, as well as aspects of several software components that provide the functionality described herein for continuous data protection. In particular, FIG. 1 is a network architecture diagram showing aspects of a storage system 100 that includes several virtualized clusters 5A-5B. A virtualized cluster is a cluster of different storage nodes that together expose a single storage device. In the example storage system 100 shown in FIG. 1, the clusters 5A-5B (collectively, clusters 5) include storage server computers 2A-2G (also referred to herein as "storage nodes" or a "node", collectively nodes 2) that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D (collectively, disks 4). Alternatively, each node may be housed in a three rack space unit storing up to fifteen hard disk drives. For instance, the node 2E includes fourteen hard disk drives 4A-4N. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to handle I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage, but the processing and mapping is done completely or primarily in a single node, is called a vertically virtualized cluster.

Data may be striped across the nodes of each storage cluster. For instance, the cluster 5A may stripe data across the storage nodes 2A, 2B, 2C, and 2D. The cluster 5B may similarly stripe data across the storage nodes 2E, 2F, and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network ("LAN") as the clusters 5A-5B or may be connected to the clusters 5A-5B via a distributed wide area network, such as the Internet. An appropriate protocol, such as the Internet Small Computer Systems Interface ("iSCSI") protocol may be utilized to enable the initiators 8A-8D to communicate with and utilize the various functions of the storage clusters 5A-5B over a wide area network such as the Internet.

Two or more disks 4 within each cluster 5A-5B or across clusters 5A-5B may be mirrored for data redundancy and protection against failure of one, or more, of the disks 4. Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Storage volume snapshots and continuous data protection features may be provided on one or more storage server computers 2A-2G, one or more storage clusters 5A-5B, or one or more client computers 8A-8N. Furthermore, the processes for implementing CDP or snapshots for CDP may execute on any of these systems or may operate in a distributed fashion with components executing across two or more of these systems.

Figure 2:
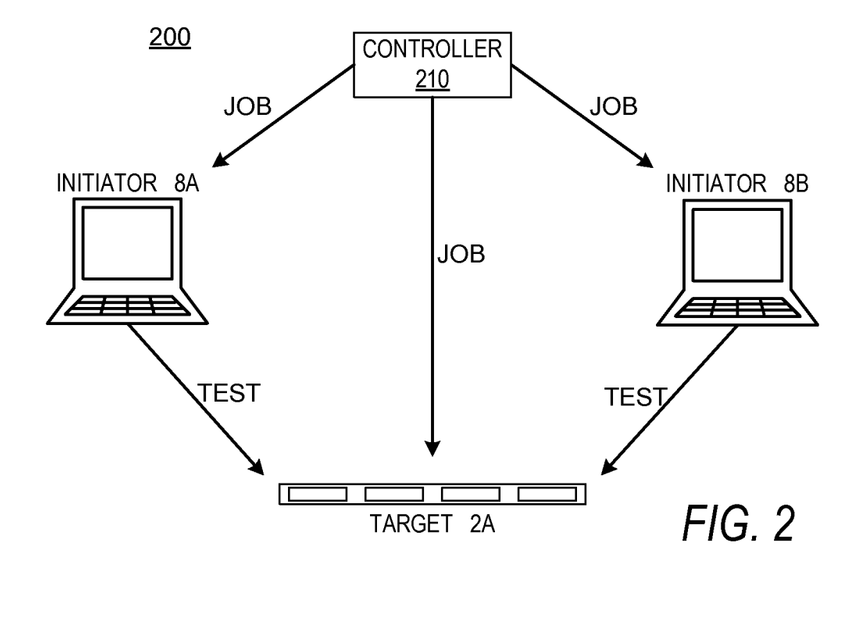
FIG. 2 is a block diagram illustrating an automated test environment with a controller, two initiators, and a target according to one exemplary embodiment.

Referring now to FIG. 2, a block diagram illustrates an automated test environment 200 with a controller 210, two initiators 8A-8B, and a target 2A according to one exemplary embodiment. The controller 210 can be implemented within a computer, an embedded computer, or any other computing system. The controller 210 can orchestrate the testing processes. The controller 210 can also act as a repository to store test scripts and reports of the test results. The initiators 8A-8B can be computer clients to the storage server target 2A and may operate using a UNIX or LINUX operating system, a MICROSOFT WINDOWS operating system from MICROSOFT CORPORATION or any other operating system. The target 2A is the storage system under test and can field storage operations from the initiators 8A-8B. The controller 210, two initiators 8A-8B, and target 2A can be interconnected using a data network, such as a local area network, a storage area network, or any other network, bus, or data interconnection mechanism.

This ATE framework can be scaled to test up to a very large number of targets in various configurations. The ATE framework can also support the addition of new tools and testing functionality for exercising new storage server features. Within the ATE framework, tests may be subdivided into jobs. The jobs can be executed sequentially, in parallel, or in any combination thereof. Multiple test suites can also run sequentially, in parallel, or in any combination thereof according to the availability of resources within the testing environment.

The tests and jobs can be defined using test script code. The test script code may be implemented within script files. The test scripts may be expressed in extensible markup language (XML) code, another markup language, or any other scripting language. While a test may be subdivided into logical portions called jobs, the jobs may be subdivided into a set of steps intended to operate on a particular system entity during a given test. A test, in the ATE framework, may be referred as a task. A set of tasks can combine to form a task order. The tasks and task orders may also be expressed in XML or some other scripting language.

The controller 210 can process task orders and tasks into jobs to be sent to the initiators 8A-8B and the target 2A. The controller 210 can maintain dependencies between jobs using a master job list and "depend on" and "wait for" relationships between jobs. The "depend on" relationship can delay a job for successful completion of another job. Similarly, the "wait for" relationship can delay a job for the completion, successful or failed, of another job.

The initiators 8A-8B and the target 2A can execute jobs issued to them and return test results back to the controller 210. A job can include information about the controller 210 and the specific instance of the test. The initiators 8A-8B or target 2A can use this information to communicate test results back to the controller 210 upon completion of the job.

Power failure scenarios can be injected to a test using a connectionless communication service between the entities of the test environment 200. A connectionless communication model between the entities within the test environment 200 can support power failure testing. The connectionless communication model can support proceeding with additional tests after a power failure. After a power failure injection, the next set of jobs can be sent to the target 2A upon its recovery from the power failure.

Figure 3:
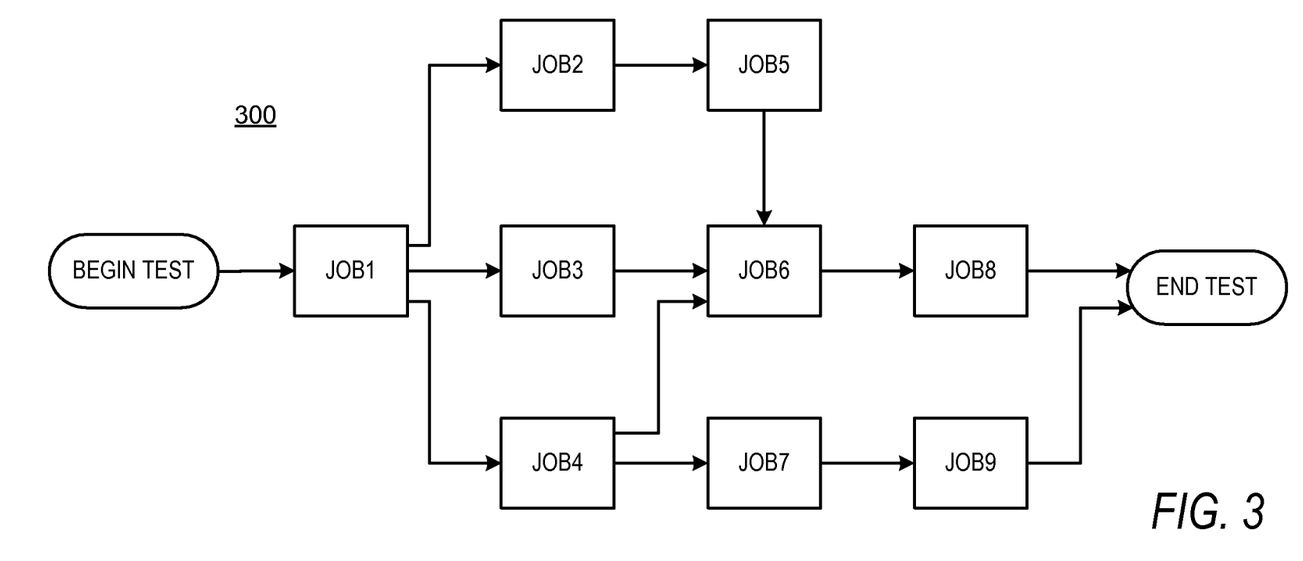
FIG. 3 is a dependency diagram illustrating the sequence of jobs within a test and the dependencies between the jobs according to one exemplary embodiment.

Turning now to FIG. 3, a dependency diagram 300 illustrates a sequence of jobs JOB1-JOB9 within a test and the dependencies between the jobs according to one exemplary embodiment. The first job to be issued from the controller 210 is JOB1. The next three jobs JOB2-JOB4 are dependent upon JOB1. This dependency may be either a "depend on" or a "wait for" relationship. As such, JOB2-JOB4 may be sent from the controller 210 only after JOB1 is completed. Similarly, JOB5 will be issued from the controller 210 only after JOB2 completes, and JOB7 will be issued for execution only after JOB4 competes. JOB6 can start only after the completion of JOB3, JOB4, and JOB5. If JOB3 and JOB4 complete before JOB5, the controller 210 can still delay until JOB5 completes before issuing JOB6. JOB 8 can be issued once JOB6 completes, and JOB 9 can be issued after JOB7 completes. Once JOB8 and JOB9 compete, the test can terminate.

Test engines present at targets 2A and initiators 8A-8B can process the jobs sent to them by the controller 210. The engines can be running on the targets 2A and initiators 8A-8B to waiting for a job to arrive for execution. Once a job is received and started, the engines can return to a listening state to await the arrival of the next job. If the engines at multiple targets 8A-8B all receive a job, all of the targets 8A-8B can process the job in parallel. Thus, multiple targets 8A-8B may be tested within the ATE framework.

A job can contain various pieces of information related to execution of the job. For example, a job may contain information about which target 2A or initiator 8A-8B it is to be issued to. A job may contain information about related scripts to be executed as part of the job. A job may contain input values to those scripts. A job may also contain "depend on" and "wait for" relationships between itself and other jobs. When an engine receives a job, a corresponding script may be executed using the specified input values. A script file associated with a job may be embedded with the job when the job is issued by the controller 210. New test tools and functionality to test new target features can be added by issuing a job to execute a new script related to the new test.

A job, which may be an XML packet, can have various values, attributes, or child elements. A job may include a description attribute to describe the job. A job may include an epoch attribute and a job name attribute that are unique to that instance of the job for identification purposes. Having unique identifiers for each job instance can be used along with the "depend on" and "wait for" relationships between jobs to support the correct sequence of job execution.

A job may also include a session ID to identify a particular job within a particular instance of a test. A job may also include a state attribute to store the state of the job. This state can be, for example, running, waiting, success, failure, or any other state. A job can have a task name attribute to identify the job with a particular task.

A job may include "controller IP" and "controller port" information related to an IP address and port number of the controller 210 issuing the job. This can support returning test status to the controller 210 upon completion of the job as part of the connectionless communication mechanism. The use of IP address and port number are merely examples, an ATE framework implemented on a non IP network may use appropriate addressing for that particular network implementation.

An engine may store information about the entity that the job has been sent to. For example, the entity may be a particular initiator or target. Jobs can be sent to multiple initiators and targets in parallel for testing multiple storage systems at the same time. Operating multiple systems concurrently can support complex test configurations and multi-entity features of a storage system.

As discussed above, a job may include a script to be executed. To add new tests or new test features, new scripts can be introduced into the ATE framework for execution. The controller 210 can store logs of the test tools and the tests being executed. The controller can support a file transfers, for example using file transfer protocol (FTP), for job scripts to use when transferring test results and test reports back to the controller 210. The controller 210 can also organize the reports by various attributes, such as product, version, software build, or task order. The controller 210 may also support email, such as the simple mail transfer protocol (SMTP) to issue emails to a specified list of personnel when tests complete or other test system events occur.

Figure 4:
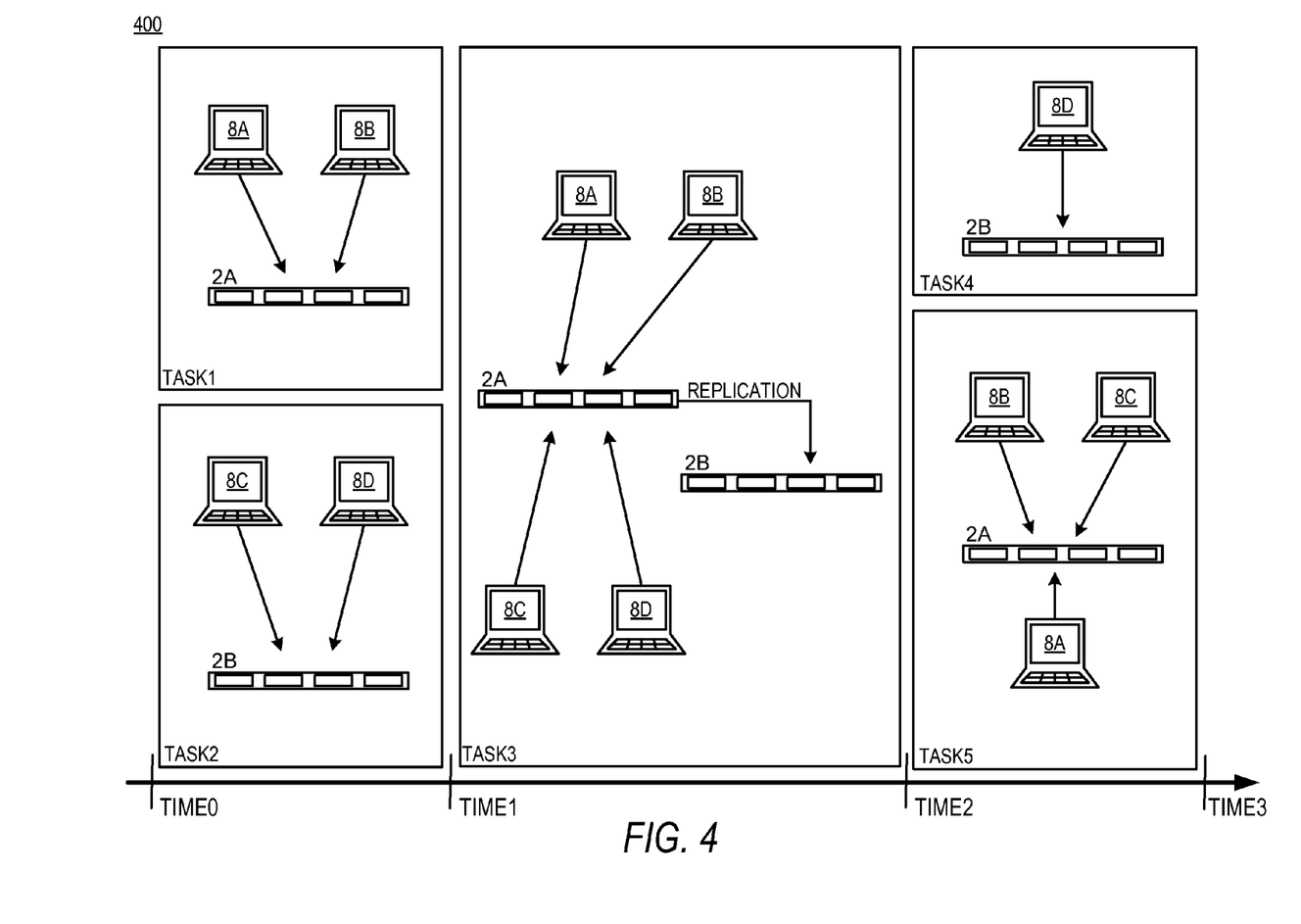
FIG. 4 is a timeline diagram illustrating the use of resources within various tasks performed by an automated test environment according to one exemplary embodiment.

Turning now to FIG. 4, a timeline diagram 400 illustrates the use of resources within various tasks performed by an automated test environment according to one exemplary embodiment. Two targets 2A-2B and four initiators 8A-8D can be scheduled to run multiple tests or tasks TASK1-TASK5. The first task TASK1 can use two initiators 8A-8B to exercise one target 2A. The second task TASK2 can also use two initiators 8C-8D to exercise one target 2B. At TIME1, when the first two tasks TASK1-TASK2 complete, the third task TASK3 can begin.

The third task TASK3, may be programmed with a "wait for" or "depend on" relationship to both TASK1 and TASK2 because TASK 3 uses resources that are also used by both TASK1 and TASK2. TASK 3 may be a replication test where three initiators 8A-8B store data to a mirrored, or replicated, data storage system with two targets 2A-2B. A first target 2A may be a primary storage server operable to replicate data stored to it by writing the same data to a secondary storage server target 2B. Upon completion of TASK3 at TIME2, two new tasks TASK4-TASK5 may be issued using the same resources again in yet another configuration.

TASK4 can execute sequentially after TASK3 and TASK3 can execute sequentially after TASK2. In the same task order however, TASK4 can execute in parallel with TASK5. Relationship dependencies in the task order, tasks, and jobs can enforce these combined sequential and parallel test execution patterns. Sine the tests may each use many hours to perform, automation of the test process through the ATE framework can support the duration of the multi-task test to continue without human intervention.

Figure 5:
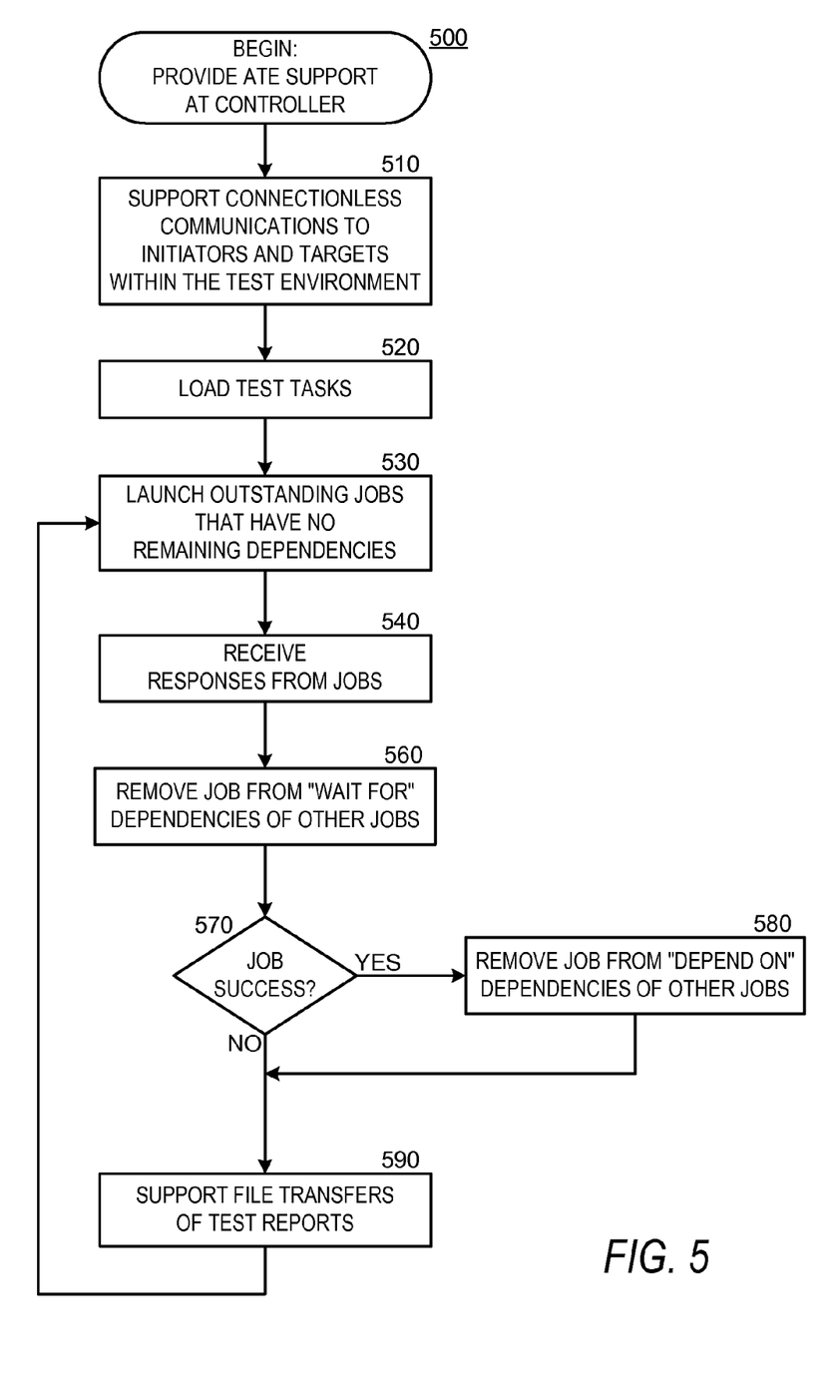
FIG. 5 is a logical flow diagram illustrating a process for providing automated test environment support at a controller according to one exemplary embodiment.

Turning now to FIG. 5, additional details will be provided regarding the embodiments presented herein for automated testing environment frameworks supporting the creation and execution of various automated tests on data storage systems. In particular, FIG. 5 is a flow diagram showing a routine 500 that illustrates aspects of a process for providing automated test environment support at a controller according to one exemplary embodiment. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 500 can begin with operation 510 where support is provided for connectionless communications from the controller to initiators and targets within the test environment. A connectionless network model can support power cycling at the targets without complications caused by broken communications connections.

At operation 520 the controller can load test tasks provided by one or more test operators. Test task orders, tests, and jobs can be provided in a scripting or markup language, such as XML, and may be associated with various test scripts.

At operation 530, the controller can send any jobs that are ready to execute out to the respective test engines residing on initiators or targets. A job may be considered ready to execute once all of its dependency relationships have been satisfied.

At operation 540, the controller can receive responses from jobs that are executing at the various test engines within the ATE. A test response can indicate that a test job completed. A test response can include information as to whether the test was a success or failure, as well as other details of the test operations.

At operation 560, "wait for" dependency relationships can be removed from other jobs that were dependent on a job completing in operation 540. In other words, jobs holding due to a "wait for" relationship with a recently completed job can have that dependency relationship removed. Removal of a dependency can take the dependent job closer to being issued for execution. However, the dependent job may also have dependency on other jobs and thus continue to hold.

At operation 570, it can be determined if one or more job have completed with successful test results. If job successes were received, the routine 500 can continue to operation 580 where "depend on" dependency relationships can be removed for other jobs. In other words, other jobs that had a "depend on" relationship with a recently successful job can have that dependency relationship removed. Removal of the dependency can take the dependent job one step closer to being issued for execution. However, the dependent job may also have dependency on other jobs and thus continue to hold. After operation 580, the routine 500 can continue to operation 590. The routine 500 can also continue to operation 590 directly from operation 570 if it was determined at operation 570 that no job successes were received.

At operation 590, file transfers support can be provided to allow test engines at initiators or targets to upload test reports or other information related to test jobs. The file transfers can use FTP or any other mechanism for transferring data or computer files to the controller. After operation 590, the routine 500 can loop back to operation 530 to launch any jobs that have had all of their dependencies removed at operation 560 and 580. This looping can continue until all of the scheduled tests are completed or until an operator stops the testing process.

According to one embodiment, the controller 210 can operate using a multithreaded model. For example, two threads may be supported to implement a task process thread and a response thread. The task process thread can perform the dependency checking of remaining jobs and launch jobs as appropriate. The response thread can listen for responses from the engine entities and update the dependency lists of the remaining jobs as appropriate whenever a completion response is received.

Figure 6:
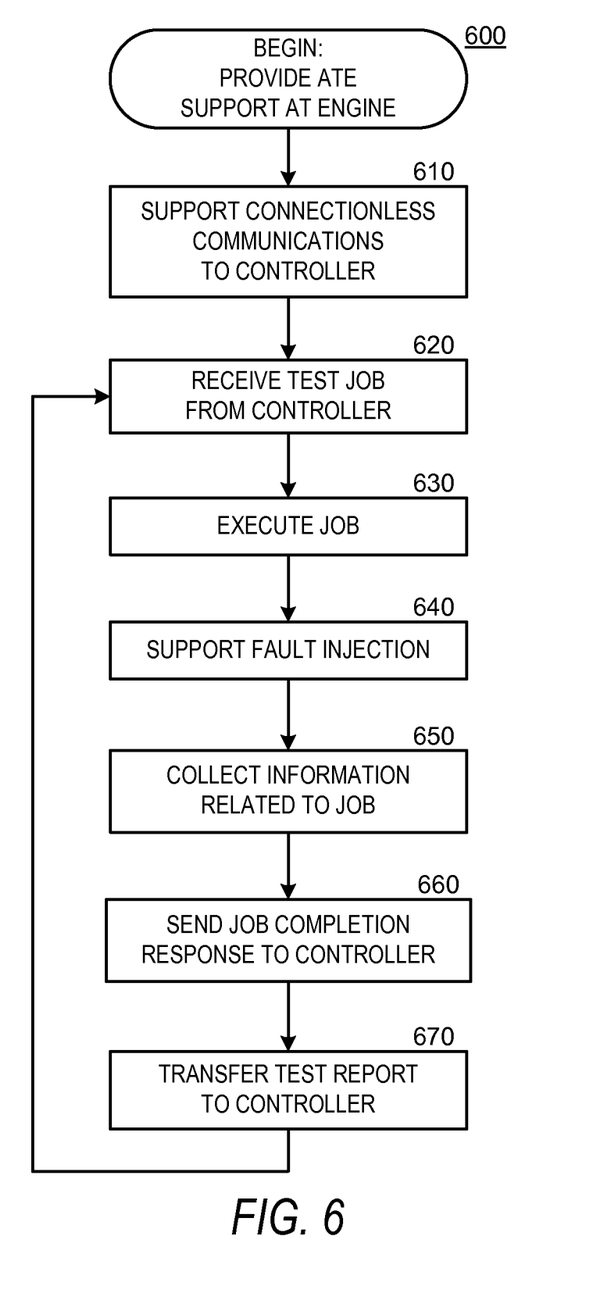
FIG. 6 is a logical flow diagram illustrating a process for providing automated test environment support at test engine according to one exemplary embodiment.

Turning now to FIG. 6, additional details will be provided regarding the embodiments presented herein for automated testing environment frameworks supporting the creation and execution of various automated tests on data storage systems. In particular, FIG. 6 is a flow diagram showing a routine 600 that illustrates aspects of a process for providing automated test environment support at a test engine according to one exemplary embodiment. The routine 600 can begin with operation 610 where support is provided for connectionless communications with the controller of the test environment. A connectionless network model can support power cycling at the targets without complications caused by broken communications connections.

At operation 620, a test job can be received from the controller. Since the controller can hold jobs until dependencies associated with the jobs are satisfied, the receipt of a job at an engine can imply that the job is immediately available for execution. At operation 630, the job received at operation 620 can be executed.

At operation 640, the engine can support fault injection. Faults just as power faults, network link failures, or various hardware malfunctions may be included in testing storage systems. While the test job is executing to exercise various functions of the storage systems under test, information related to the tests can be collected by operation 650.

Once a job is completed according to the various scripts associated with the job, operation 660 can send a job completion response from the engine back to the controller. After a job is completed, operation 670 can also use file transfer services provided by the controller to transfer test reports or other information related to the testing to the controller from an engine at an initiator or a target. After operation 670, the routine 600 can loop back to operation 620 in order to receive another test from the controller and continue the testing procedure as discussed above. This looping can continue until all testing in completed or the engine operation is terminated.

Figure 7:
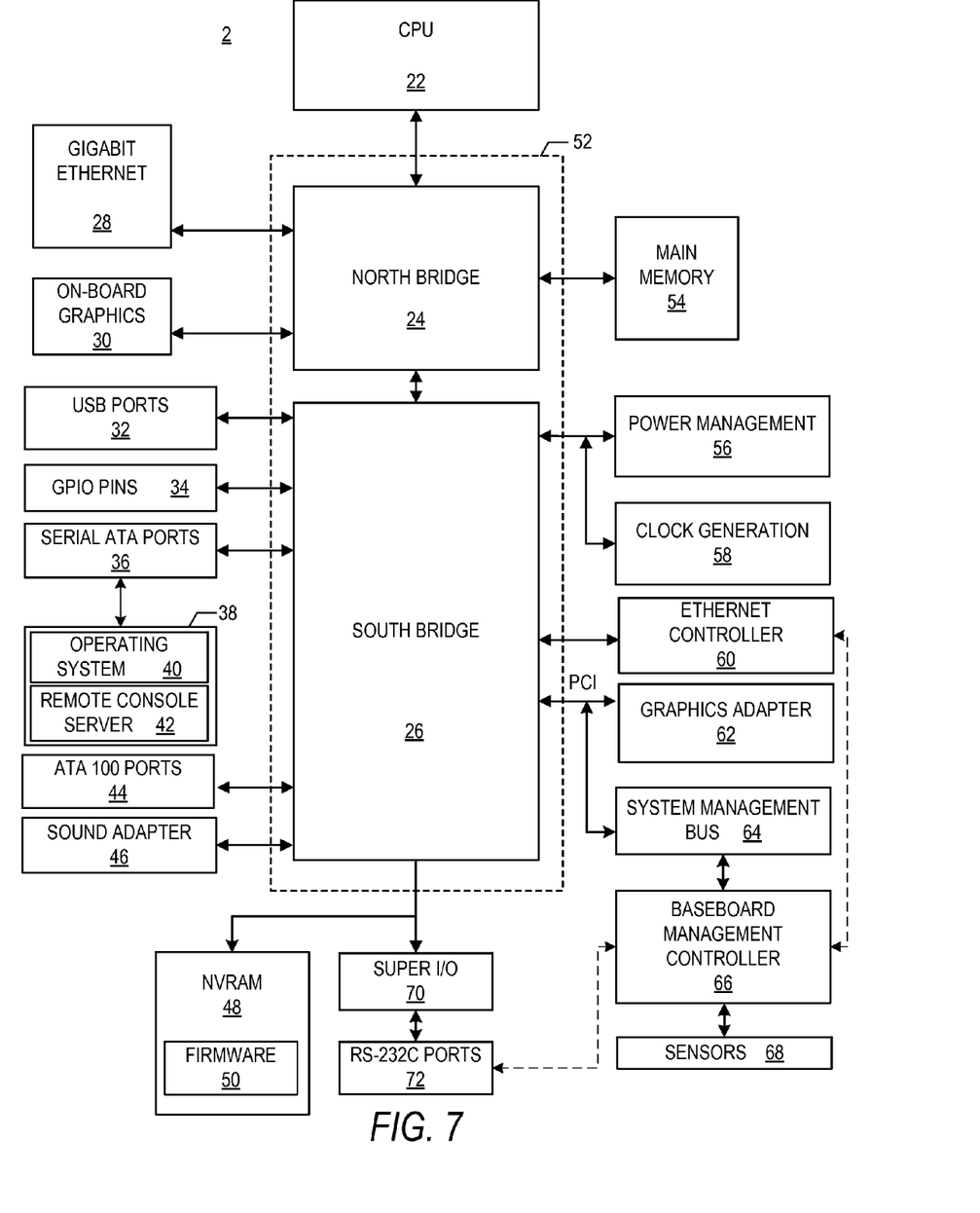
FIG. 7 is a computer architecture diagram illustrating a computer hardware architecture for a computing system capable of operation within an automated test environment framework.

FIG. 7 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

In particular, FIG. 7 shows an illustrative computer architecture for a storage server computer 2 that may be utilized in the implementations described herein. Such a illustrative computer system can also be used for a controller 210. Such an illustrative computer system may also describe a client computer system 8A-8N. The storage node computer 2 includes a baseboard, or "motherboard", which is a printed circuit board to which a multitude of components or devices may be connected by way of a system bus or other electrical communication paths. In one illustrative embodiment, a CPU 22 operates in conjunction with a chipset 52. The CPU 22 is a standard central processor that performs arithmetic and logical operations necessary for the operation of the computer. The storage node computer 2 may include a multitude of CPUs 22.

The chipset 52 includes a north bridge 24 and a south bridge 26. The north bridge 24 provides an interface between the CPU 22 and the remainder of the computer 2. The north bridge 24 also provides an interface to a random access memory ("RAM") used as the main memory 54 in the computer 2 and, possibly, to an on-board graphics adapter 30. The north bridge 24 may also include functionality for providing networking functionality through a gigabit Ethernet adapter 28. The gigabit Ethernet adapter 28 is capable of connecting the computer 2 to another computer via a network. Connections which may be made by the network adapter 28 may include LAN or WAN connections. LAN and WAN networking environments are commonplace in offices, enterprise-wide computer networks, intranets, and the internet. The north bridge 24 is connected to the south bridge 26.

The south bridge 26 is responsible for controlling many of the input/output functions of the computer 2. In particular, the south bridge 26 may provide one or more universal serial bus ("USB") ports 32, a sound adapter 46, an Ethernet controller 60, and one or more general purpose input/output ("GPIO") pins 34. The south bridge 26 may also provide a bus for interfacing peripheral card devices such as a graphics adapter 62. In one embodiment, the bus comprises a peripheral component interconnect ("PCI") bus. The south bridge 26 may also provide a system management bus 64 for use in managing the various components of the computer 2. Additional details regarding the operation of the system management bus 64 and its connected components are provided below.

The south bridge 26 is also operative to provide one or more interfaces for connecting mass storage devices to the computer 2. For instance, according to an embodiment, the south bridge 26 includes a serial advanced technology attachment ("SATA") adapter for providing one or more serial ATA ports 36 and an ATA 100 adapter for providing one or more ATA 100 ports 44. The serial ATA ports 36 and the ATA 100 ports 44 may be, in turn, connected to one or more mass storage devices storing an operating system 40 and application programs, such as the SATA disk drive 38. As known to those skilled in the art, an operating system 40 comprises a set of programs that control operations of a computer and allocation of resources. An application program is software that runs on top of the operating system software, or other runtime environment, and uses computer resources to perform application specific tasks desired by the user.

According to one embodiment of the invention, the operating system 40 comprises the LINUX operating system. According to another embodiment of the invention the operating system 40 comprises the WINDOWS SERVER operating system from MICROSOFT CORPORATION. According to another embodiment, the operating system 40 comprises the UNIX or SOLARIS operating system. It should be appreciated that other operating systems may also be utilized.

The mass storage devices connected to the south bridge 26, and their associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 6 for connecting a "Super I/O" device 70. The Super I/O device 70 is responsible for providing a number of input/output ports, including a keyboard port, a mouse port, a serial interface 72, a parallel port, and other types of input/output ports. The LPC interface may also connect a computer storage media such as a ROM or a flash memory such as a NVRAM 48 for storing the firmware 50 that includes program code containing the basic routines that help to start up the computer 2 and to transfer information between elements within the computer 2.

As described briefly above, the south bridge 26 may include a system management bus 64. The system management bus 64 may include a BMC 66. In general, the BMC 66 is a microcontroller that monitors operation of the computer system 2. In a more specific embodiment, the BMC 66 monitors health-related aspects associated with the computer system 2, such as, but not limited to, the temperature of one or more components of the computer system 2, speed of rotational components (e.g., spindle motor, CPU Fan, etc.) within the system, the voltage across or applied to one or more components within the system 2, and the available or used capacity of memory devices within the system 2. To accomplish these monitoring functions, the BMC 66 is communicatively connected to one or more components by way of the management bus 64. In an embodiment, these components include sensor devices for measuring various operating and performance-related parameters within the computer system 2. The sensor devices may be either hardware or software based components configured or programmed to measure or detect one or more of the various operating and performance-related parameters. The BMC 66 functions as the master on the management bus 64 in most circumstances, but may also function as either a master or a slave in other circumstances. Each of the various components communicatively connected to the BMC 66 by way of the management bus 64 is addressed using a slave address. The management bus 64 is used by the BMC 66 to request and/or receive various operating and performance-related parameters from one or more components, which are also communicatively connected to the management bus 64.

It should be appreciated that the computer 2 may comprise other types of computing devices, including hand-held computers, embedded computer systems, personal digital assistants, and other types of computing devices known to those skilled in the art. It is also contemplated that the computer 2 may not include all of the components shown in FIG. 7, may include other components that are not explicitly shown in FIG. 7, or may utilize an architecture completely different than that shown in FIG. 7.

Based on the foregoing, it should be appreciated that automated testing environment frameworks supporting the creation and execution of various automated tests on data storage systems are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for providing an automated test environment for data storage systems, the method comprising:
   scheduling test jobs to avoid resource conflicts;
   scheduling test jobs according to specified dependency relationships;
   embedding test jobs with attribute information to support the correct sequence of job execution, the attribute information including information regarding the specified dependency relationships;
   sending test jobs to storage servers as scheduled;
   sending test jobs to storage initiators as scheduled;
   receiving completion responses from sent test jobs; and
   removing the information regarding the specified dependency relationships from the attribute information upon completion of the sent test jobs.

2. The method of claim 1, further comprising supporting the expansion of test functionality by adding new test scripts.

3. The method of claim 1, wherein scheduling test jobs according to specified dependency relationships comprises issuing a second job in response to a first job completing.

4. The method of claim 1, wherein scheduling test jobs according to specified dependency relationships comprises issuing a second job in response to a first job completing with a successful test result.

5. The method of claim 1, further comprising supporting connectionless communications with the storage servers and the storage initiators.

6. The method of claim 1, further comprising injecting storage server power failures into the automated test environment as scheduled.

7. The method of claim 1, further comprising supporting file transfers within the automated test environment for transferring test data.

8. A non-transitory computer storage medium having computer-executable instructions stored thereon which, when executed by a computer system, cause the computer system to:
   schedule test jobs to avoid resource conflicts;
   schedule test jobs according to specified dependency relationships;
   embed test jobs with attribute information to support the correct sequence of job execution, the attribute information including information regarding the specified dependency relationships;
   send test jobs to storage servers as scheduled;
   send test jobs to storage initiators as scheduled;
   receive completion responses from sent test jobs; and
   remove the information regarding the specified dependency relationships from the attribute information upon completion of the sent test jobs.

9. The non-transitory computer storage medium of claim 8, further comprising causing the computer system to support the expansion of test functionality by adding new test scripts.

10. The non-transitory computer storage medium of claim 8, wherein scheduling test jobs according to specified dependency relationships comprises issuing a second job in response to a first job completing.

11. The non-transitory computer storage medium of claim 8, wherein scheduling test jobs according to specified dependency relationships comprises issuing a second job in response to a first job completing with a successful test result.

12. The non-transitory computer storage medium of claim 8, further comprising causing the computer system to support connectionless communications with the storage servers and the storage initiators.

13. The non-transitory computer storage medium of claim 8, further comprising causing the computer system to inject storage server power failures into the automated test environment as scheduled.

14. The non-transitory computer storage medium of claim 8, further comprising causing the computer system to support file transfers within the automated test environment for transferring test data.

15. A system for automating data storage system testing comprising:
   a test controller;
   a storage server under test;
   a connectionless communication mechanism between the controller and the storage server under test;
   a processing unit associated with the controller;
   and one or more modules for execution on the processing unit, operable to schedule test jobs to avoid resource conflicts, schedule test jobs according to specified dependency relationships, embed test jobs with attribute information including information regarding the specified dependency relationships to support the correct sequence of job execution, send test jobs to the storage server as scheduled, send test jobs to storage initiators as scheduled, receive completion responses from sent test jobs, and remove the information regarding the specified dependency relationships from the attribute information upon completion of the sent test jobs.

16. The system of claim 15, wherein the one or more modules for execution on the processing unit are further operable to support the expansion of test functionality by adding new test scripts.

17. The system of claim 15, wherein scheduling test jobs according to specified dependency relationships comprises issuing a second job in response to a first job completing.

18. The system of claim 15, wherein scheduling test jobs according to specified dependency relationships comprises issuing a second job in response to a first job completing with a successful test result.

19. The system of claim 15, wherein the one or more modules for execution on the processing unit are further operable to inject storage server power failures into the automated test environment as scheduled.

20. The system of claim 15, wherein the one or more modules for execution on the processing unit are further operable to support file transfers within the automated test environment for transferring test data.

* * * * *